United States Patent
Park et al.

(10) Patent No.: US 8,971,941 B2
(45) Date of Patent: Mar. 3, 2015

(54) METHOD AND APPARATUS FOR OPTIMIZING RADIO FREQUENCY TRANSMISSION PERFORMANCE IN ADAPTATION TO NETWORK ENVIRONMENT

(75) Inventors: Jung Min Park, Seoul (KR); Dae Ung Jeong, Pohang-si (KR); Yu Seon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 13/272,497

(22) Filed: Oct. 13, 2011

(65) Prior Publication Data

US 2012/0094708 A1 Apr. 19, 2012

(30) Foreign Application Priority Data

Oct. 13, 2010 (KR) ........................ 10-2010-0099754

(51) Int. Cl.
*H04B 7/00* (2006.01)
*H04W 28/18* (2009.01)
*H04B 1/04* (2006.01)
*H04W 28/04* (2009.01)
*H04W 84/08* (2009.01)
*H04W 52/50* (2009.01)
*H04L 5/00* (2006.01)
*H04W 28/06* (2009.01)
*H04W 52/04* (2009.01)
*H04W 72/04* (2009.01)

(52) U.S. Cl.
CPC .............. *H04W 28/18* (2013.01); *H04W 28/04* (2013.01); *H04W 84/08* (2013.01); *H04W 52/50* (2013.01); *H04B 1/0458* (2013.01); *H04L 5/0094* (2013.01); *H04W 28/06* (2013.01); *H04W 52/04* (2013.01); *H04W 72/042* (2013.01); *H04W 72/0453* (2013.01)
USPC ........... 455/509; 455/450; 455/500; 455/517; 455/67.11; 455/515; 370/328; 370/329; 370/343; 370/338; 370/310

(58) Field of Classification Search
CPC ...... H04W 84/08; H04W 28/04; H04W 52/50
USPC ......... 455/509, 511, 515, 516, 500, 517, 450, 455/422.1, 403, 550.1, 522, 69, 426.1, 455/426.2, 67.11, 423–425; 370/328, 329, 370/343, 338, 310
See application file for complete search history.

(56) References Cited

U.S. PATENT DOCUMENTS

| 7,194,282 | B2 * | 3/2007 | Jarvisalo et al. | 455/522 |
| 2004/0075504 | A1 * | 4/2004 | Vintola | 330/298 |
| 2008/0119214 | A1 * | 5/2008 | Liu et al. | 455/522 |

* cited by examiner

*Primary Examiner* — Keith Ferguson
(74) *Attorney, Agent, or Firm* — Jefferson IP Law, LLP

(57) ABSTRACT

A method and apparatus for optimizing transmission performance of a mobile terminal by adjusting a matching value of the transmitter of the mobile terminal based on the allocation information from the network are provided. The transmission performance optimization method of a mobile terminal according to the present invention includes acquiring allocation information from a network, searching for a group of information matching the allocation information from a predetermined mapping table, generating a control signal for adjusting a match value according to the group, and adjusting the matching value of a transmitter of the mobile terminal by changing impedance according to the control signal.

16 Claims, 3 Drawing Sheets

METHOD AND APPARATUS FOR OPTIMIZING RADIO FREQUENCY TRANSMISSION PERFORMANCE IN ADAPTATION TO NETWORK ENVIRONMENT

PRIORITY

This application claims the benefit under 35 U.S.C. §119 (a) of a Korean patent application filed on Oct. 13, 2010 in the Korean Intellectual Property Office and assigned Serial No. 10-2010-0099754, the entire disclosure of which is hereby incorporated by reference.

BACKGROUND OF THE INVENTION

1. Field of the Invention

The present invention relates to a transmission method and apparatus of a mobile terminal. More particularly, the present invention relates to a method and apparatus for optimizing transmission performance of a mobile terminal by adjusting a matching value of the transmitter of the mobile terminal based on the allocation information from the network.

2. Description of the Related Art

With the rapid advance of mobile communication technologies, the popularity of mobile terminals is constantly on the rise. A mobile terminal amplifies a Radio Frequency (RF) signal carrying various control and voice data to a predetermined level and transmits the amplified radio signal by means of an antenna.

Typically, an RF transmitter of a mobile terminal is provided with a filter for bandwidth-filtering to output an RF transmission signal, a Power Amplifier Module (PAM) for amplifying the RF signal output by the filter, and a duplexer for transmitting the amplified RF signal through the antenna.

The internal configuration of the RF transmitter is fixed except that the mobile terminal uses a frequency assigned by a network. Meanwhile, there are 5 parameters (i.e., bandwidth, modulation, Resource Blocks (RBs), RB offset, and frequency, (hereinafter, also referred to as allocation information)) that change in adaptation to the variation of the network environment. The mobile terminal should secure the RF transmit power in spite of the change of network environment, and there can be several hundred thousands or millions of cases of the network environment. Accordingly, in case of the RF transmitter of the mobile terminal having a fixed configuration, the deviation of its transmission performance may vary greatly according to the number of cases of the network environment.

In a mobile terminal of the related art, the transmit power calibration for the change of network environment is made uniformly with the compensation value of a specific network environment to other network environments and, as a consequence, it is difficult to expect precise calibration for the maximum transmit power and offset in different network environments. As aforementioned, since there are a large number of cases of network environment that can be taken into account, it is difficult to compensate the maximum transmit power of the transmitter accurately for the individual cases of the network environment. That is, the transmission method of the related art has a drawback of a long delay and significant effort to compensate the transmit power for diverse cases of the network environment.

SUMMARY OF THE INVENTION

Aspects of the present invention are to address at least the above-mentioned problems and/or disadvantages and to provide at least the advantages described below. Accordingly, an aspect of the present invention is to provide a method and apparatus that are capable of optimizing transmission performance of a mobile terminal.

Another aspect of the present invention is to provide a method and apparatus that are capable of optimally maintaining the transmission performance of a mobile terminal for any network environment.

Another aspect of the present invention is to provide a method and apparatus for optimizing the transmit power in adaptation to the variation of network environment by adjusting the matching value of the Radio Frequency (RF) transmitted by the mobile terminal according to the allocation information as the resource allocation conditions of the network.

Still another aspect of the present invention is to provide a method and apparatus that are capable of maintaining the transmission performance of a mobile terminal optimally regardless of the change of the network environment by adjusting the matching value of an RF transmitter in adaptation to the change of the network environment.

In accordance with an aspect of the present invention, a method for optimizing transmission performance of a mobile terminal is provided. The method includes acquiring allocation information from a network, searching for a group of information matching the allocation information from a predetermined mapping table, generating a control signal for adjusting a match value according to the group, and adjusting the matching value of a transmitter of the mobile terminal by changing impedance according to the control signal.

In accordance with another aspect of the present invention, a computer-readable storage medium is provided. The computer storage medium includes a program for executing the above method by a processor.

In accordance with another aspect of the present invention, an apparatus is provided. The apparatus includes a control unit for controlling transmitting a radio frequency signal, for analyzing allocation information received from a network, and for generating a control signal for maintaining transmit power of the radio frequency signal at a predetermined level based on the allocation information, and an RF transmitter for adjusting a matching value according to the control signal generated by the control unit and for transmitting the radio frequency signal at the transmit power level determined based on the adjusted matching value.

Preferably, the RF transmitter includes a power amplifier module for amplifying the radio frequency signal to a level to be transmitted via an antenna, a matching circuit for performing impedance matching, a variable impedance circuit for changing the matching value of the matching circuit, and a duplexer for transmitting the radio frequency signal at the transmit power level determined by the matching value adjusted by the variable impedance circuit.

Other aspects, advantages, and salient features the invention will become apparent to those skilled in the art from the detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
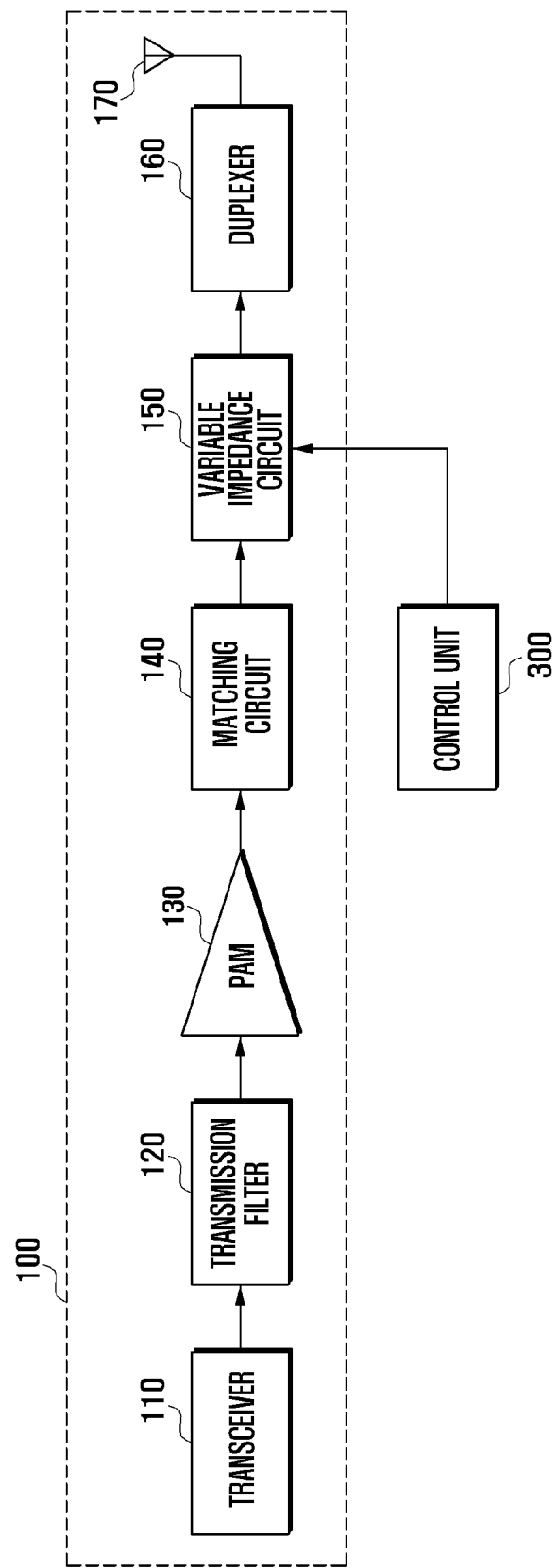
FIG. 1 is a block diagram illustrating a configuration of a Radio Frequency (RF) transmitter of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention propose a method for optimizing the transmission performance of a mobile terminal in adaptation to a network environment based on the allocation information provided by the network and an apparatus for supporting the method. In an exemplary embodiment of the present invention, the allocation information includes the conditions about the bandwidth, modulation scheme, Resource Block (RB), offset, and frequency allocated by the network.

According to an exemplary embodiment of the present invention, once the mobile terminal is registered with (attached to) the network, the network sends the mobile terminal the allocation information including bandwidth, modulation scheme, resource region, resource region offset, and frequency. If the allocation information is received, the mobile terminal retrieves a specific group fulfilling the conditions included in the allocation information from a predefined mapping table. The mobile terminal generates a control signal mapped to the retrieved group to adjust the matching value of a Radio Frequency (RF) transmitter such that the mobile terminal is capable of maintaining its optimal transmission performance based on the matching value set optimally in adaptation to the network environment. That is, exemplary embodiments of the present invention are capable of adjusting the matching value of the RF transmitter of the mobile terminal based on the allocation information provided by the network such that the mobile terminal can operate in optimized transmission performance regardless of the change of network environment.

The configuration of a mobile terminal and method for controlling the mobile terminal according to an exemplary embodiment of the present invention are described hereinafter with reference to the accompanying drawings. The present invention is not limited to the following description, but various modifications and changes may be made thereto without departing from the broader spirit and scope of the invention.

FIG. 1 is a block diagram illustrating a configuration of an RF transmitter of a mobile terminal according to an exemplary embodiment of the present invention.

Referring to FIG. 1, the RF transmitter 100 of the mobile terminal includes a transceiver 110, a transmission filter 120, a Power Amplifier Module (PAM) 130, a matching circuit 140, a variable impedance Integrated Circuit (IC) 150, a duplexer 160, and an antenna 170. The mobile terminal includes a control unit 300 for controlling the RF transmitter 100 to transmit the RF signal.

Although not depicted, the mobile terminal can include at least one of a display unit, a storage unit, an audio processing unit having a microphone and a speaker, a digital broadcast module supporting Digital Multimedia Broadcasting (DMB) or Digital Video Broadcasting (DVB), a camera module for taking still and motion pictures, a Bluetooth module for supporting Bluetooth communication, a touchpad for receiving touch input, an input unit for receiving physical key input, a battery for supplying power to the internal function blocks of the mobile terminal, and an RF receiver corresponding to the RF transmitter.

The RF transmitter 100 is responsible for transmitting RF signals at a transmit power level optimized for the mobile terminal based on the matching value adjusted according to a control signal of the control unit 300.

The transceiver 110 is composed of a transmitter and a receiver and is responsible for transmitting and receiving RF signals to and from the network simultaneously.

The transmission filter 120 performs bandwidth filtering to output the RF signal to be transmitted. That is, the transmission filter 120 passes a narrow band of frequency to output the wanted signal and can be a Surface Acoustic Wave (SAW) filter having a small size or a Bulk Acoustic Wave (BAW) filter among the filters having the same features.

The PAM 130 is responsible for amplifying the transmission RF signal so as to be transmitted through the antenna 170 at a predetermined power level.

The matching circuit 140 is responsible for matching the impedance (ratio of the alternate current (I) flowing in the circuit to the alternate voltage (V) applied to the alternate circuit and is expressed in unit of ohm Ω) between the PAM 130 and the duplexer 160. That is, the matching circuit 140 is responsible for reducing the power loss by matching the complex conjugate values of the impedance of a circuit (output impedance in view of the output node of the PAM 130) and the input impedance of another circuit (e.g., duplexer 160).

The variable impedance IC 150 is responsible for changing the matching value matched with the matching circuit 140. That is, the variable impedance IC 150 driven according to a control signal issued by the control unit 300 and is responsible for maintaining optimal performance by adjusting the impedance in response to the control signal in adaptation of the network environment.

The duplexer 160 is connected to the antenna 170 and responsible for isolating the transmission and reception paths. That is, the duplexer 160 is capable of avoiding interference between the transmission and reception waves sharing the antenna 170 such that the RF transmitter and the RF receiver (not shown) connected to the duplexer 160 can operate simultaneously. In exemplary embodiments of the present invention, the duplexer 160 is capable of transmitting the transmission RF signal via the antenna 170 at the transmit power determined according to the matching value adjusted by the variable impedance IC 150.

The control unit 300 controls overall operations of the transceiver 110, the transmission filter 120, the PAM 130, the matching circuit 140, the variable impedance IC 150, the duplexer 160, and the antenna 170 to transmit the RF signal. The control unit 300 also can control the operations of the RF receiver for receiving an RF signal. The control unit 300 can control a baseband module representatively.

In an exemplary embodiment of the present invention, the control unit 300 can determine the parameters by parsing the allocation information which is transmitted by the network and received by means of the RF receiver. The control unit 300 generates the control signal for maintaining the transmit power at a level optimized for the transmission performance of the RF signal based on the allocation information. That is, the control unit 300 generates a predetermined control signal for adjusting the impedance of the variable impedance IC 150 for maintaining the transmit power at an optimized level. The variable impedance IC 150 changes the impedance according to the control signal generated by the control unit 300. In an exemplary embodiment of the present invention, the control unit 300 is provided with at least one control pin through which the control signal for adjusting the impedance is delivered to the variable impedance IC 150.

As aforementioned, according to an exemplary embodiment of the present invention, the control unit 300 can generate the control signal for compensating the RF transmit power in adaptation of the network environment. That is, the control unit 300 can determine the condition of the network environment based on the allocation information received from the network. The control unit 300 also can determine the impedance for optimizing the transmission performance in the network environment by referencing a predefined mapping table in association with the allocation information. The control unit 300 can transfer the control signal for adjusting the impedance to the determined value to the variable impedance IC 150.

A description is made of a procedure for determining the variable impedance according to an exemplary embodiment of the present invention.

The description is directed to the case where the transmission performance of the mobile terminal is optimized in the network environment of a Long Term Evolution (LTE) system. LTE is the term used to describe the "long-term evolution" of the 3$^{rd}$ Generation (3G) mobile communication technology. LTE is also referred to as 3.9G to denote technology which comes between the 3G (represented by Wideband Code Division Multiple Access (WCDMA) and CDMA-2000) and 4G mobile communication technologies.

LTE is based on the 3$^{rd}$ Generation Partnership Project (3GPP) release 8. LTE has support for scalable bandwidth from 1.25 MHz to 20 MHz promising 100 Mbps in downlink and 50 Mbps in uplink. LTE has adopted Orthogonal Frequency Division Multiplexing (OFDM) for the downlink transmission and Multiple Input Multiple Output (MIMO) for high speed packet transmission. Also, because the technology evolved from the WCDMA-based 3G mobile communication standard, LTE is interoperable with the legacy 3G mobile communication network.

As aforementioned, in the LTE mobile communication system, the five parameters (i.e., bandwidth, modulation, RB, RB offset, and frequency) assigned to the mobile terminal vary according to the change of the network environment. Accordingly, there can be several hundred thousands or millions of cases of the network environment. In view of the RF transmitter of the mobile terminal which is fixed in configuration, its transmission performance deviation according to the number of cases of the network environment may become great. This is described with reference to the exemplary cases with the parameters shown in Table 1 and Table 2.

TABLE 1

| Parameter | Value | Number of cases |
| --- | --- | --- |
| Bandwidth | 10 Mhz | 1 |
| Modulation | QPSK/16QAM | 2 |
| RB | 1, 2, 3, 4, . . . , 49, 50 | 50 |
| RB offset | 1, 2, 3, . . . , 48, 49 | 49 |
| Center Frequency | 2505, 2506, 2508, . . . , 2563, 2564 | 60 |
| Result | | 294,000 |

TABLE 2

| Parameter | Value | Number of cases |
| --- | --- | --- |
| Bandwidth | 20 Mhz | 1 |
| Modulation | QPSK/16QAM | 2 |
| RB | 1, 2, 3, 4, . . . , 99, 100 | 100 |
| RB offset | 1, 2, 3, . . . , 98, 99 | 99 |
| Center Frequency | 2510, 2511, 2512, . . . , 2554, 2559 | 50 |
| Result | | 990,000 |

As shown in Table 1 and Table 2, even in the case of assuming the LTE system supporting only two bandwidths of 10 MHz and 20 MHz and two modulation schemes of Quadrature Phase Shift Keying (QPSK) and 16 Quadrature Amplitude Modulation (16QAM), the number of cases exceeds a hundred thousand. In the exemplary case of Table 1 where the number of cases is 1 for the parameter <bandwidth=10>, 2 for the parameter <modulation=QPSK/QAM>, 50 for the parameter <RB=1~50>, and 60 for the parameter <frequency=2505~2564>, the total number of cases of the network environment considering all five parameters becomes 294,000. In the other exemplary case of Table 2 where the number of cases is 1 for the parameter <bandwidth=20>, 2 for the parameter <modulation=QPSK/QAM>, 100 for the parameter <RB=1-100>, and 50 for the parameter <frequency=2510~2559>, the total number of cases of the network environment considering all five parameters becomes 990,000.

Accordingly, assuming that the LTE system supports the bandwidths of 10 MHz and 20 MHz and modulation schemes of QPSK and 16QAM, the total number of cases of the network environment increases up to 1,284,000. In the real system, however, the bandwidth of the LTE system is scalable from 1.25 MHz to 20 MHz, and thus the number of cases of the network environment increases excessively. Unfortunately, the legacy mobile terminal uses only the given matching value without taking this into consideration. Also, it is difficult for the developers to design the transmitter with the matching value which is adjustable in consideration of all of the number of cases of the network environment. Accordingly, the transmission performance deviation of the mobile terminal equipped with the RF transmitter configured with fixed components increases significantly.

In an exemplary embodiment of the present invention, a method and apparatus for optimizing the transmission performance of the mobile terminal in the time-varying network environment as described above is proposed. As described above, the RF transmitter 100 of the mobile terminal according to an exemplary embodiment of the present invention includes a variable impedance IC 150. The control unit 300 determines the impedance to maintain the transmission performance at an optimized level in adaptation to the network environment (i.e., maintaining the transmit power at an optimized level) and generates the control signal for adjusting the impedance to the variable impedance IC 150. As a consequence, the transmission method and apparatus according to an exemplary embodiment of the present invention is capable of compensating the transmit power in adaptation to the variation of the network environment, resulting in maintenance of the transmission performance at the optimized level.

For this purpose, the system according to an exemplary embodiment of the present invention can use the mapping table as shown in Table 3.

TABLE 3

| Group | Parameter | | | | | |
|---|---|---|---|---|---|---|
| | Bandwidth | Modulation | RB | RB offset | Center Frequency | Impedance control |
| Group 1 | A | X | 1 | 1 | 2505 | $C_1$ |
| | | | . | . | . | |
| | | | . | . | . | |
| | | | . | . | . | |
| | | | 50 | 49 | 2564 | |
| Group 2 | A | Y | 1 | 1 | 2510 | $C_2$ |
| | | | . | . | . | |
| | | | . | . | . | |
| | | | . | . | . | |
| | | | 50 | 49 | 2564 | |
| Group 3 | B | X | 1 | 1 | 2510 | $C_3$ |
| | | | . | . | . | |
| | | | . | . | . | |
| | | | . | . | . | |
| | | | 100 | 99 | 2599 | |
| | | | . | | | |
| | | | . | | | |
| | | | . | | | |
| Group N | | ... | | | | $C_N$ |

Table 3 shows an exemplary mapping table in which the allocation information is classified into groups according to a predetermined rule. The mapping table can be stored in a storage unit (not shown) of the mobile terminal. For example, the mapping table may be stored at the manufacturing stage or may be input at a later time, such as by a download. The mapping table can be updated via the network. Assuming that an optimized transmit power determined in consideration of the characteristics of the mobile terminal is fixed to a specific value (e.g., Z), the groups classified in the mapping table are assigned the control values for adjusting the impedance to compensate for the optimized transmit power level according to the given allocation information.

For example, the control signal ($C_1$), for controlling the impedance to be adjusted to maintain the optimized transmit power level (e.g., Z) in the given network environment, is mapped to Group 1, the control signal ($C_2$), for controlling the impedance to be adjusted to maintain the optimized transmit power level (e.g., Z) in the given network environment, is mapped to Group 2, the control signal ($C_3$), for controlling the impedance to be adjusted to maintain the optimized transmit power level (e.g., Z) in the given network environment, is mapped to Group 3, and the control signal ($C_N$), for controlling the impedance to be adjusted to maintain the optimized transmit power level (e.g., Z) in the given network environment, is mapped to Group N.

In an exemplary embodiment of the present invention, the given optimal transmit power levels are mapped to the respective groups, and the corresponding control signals are assigned for adjusting the impedance to the corresponding values for maintaining the optimized transmit power levels in adaptation to the network environment corresponding to the groups as shown in Table 4. Accordingly, the control unit 300 identifies the network environment based on the acquired allocation information and generates the control signal for adjusting the impedance to an appropriate value for the identified network environment to the variable impedance IC 150. The variable impedance IC 150 can adjust the impedance value according to the control signal received from the control unit 300. In this manner, exemplary embodiments of the present invention are capable of maintaining the optimal transmission performance by adjusting the matching value of the RF transmitter 100 of the mobile terminal automatically in adaptation to the network environment.

TABLE 4

| Control signal | Impedance |
|---|---|
| $C_1$ | First impedance |
| $C_2$ | Second impedance |
| $C_3$ | Third impedance |
| . | . |
| . | . |
| . | . |
| $C_N$ | $N^{th}$ impedance |

Table 3 shows an exemplary mapping table in which the parameters are grouped into N groups (N is a natural value equal to or greater than 1) according to the bandwidths 1.25 MHz~20 MHz of the LTE system. In Table 3, the N groups are discriminated based on the <bandwidth> and <modulation> parameters. Associating with Table 1 and Table 2, A and B of the bandwidth parameter in Table 3 can correspond to 10 MHz and 20 MHz respectively. Also, X and Y of the modulation parameter in Table 3 can correspond to the QPSK and 16QAM respectively. In this case, the total number of groups for discriminating network environments is 4 (N=4).

Explaining the transmission performance optimization of the mobile terminal supporting the method according to exemplary embodiments of the present invention with reference to the exemplary mapping table of Table 2, when attempting attach to the network, the mobile terminal can acquire the allocation information on the bandwidth, modulation scheme, RB, RB offset, and frequency. The mobile terminal also can determine the values of the individual parameters by analyzing the acquired allocation information.

The mobile terminal can compare the acquired allocation information with the values stored in the mapping table. At this time, the mobile terminal can select at least one group having the bandwidth matching with the one indicated in the acquired allocation information by comparing the bandwidth parameters. The mobile terminal can determine the group having the modulation scheme matching with that indicated in the acquired allocation information finally by comparing the modulation parameters. In order to adjust the impedance for the finally determined group to an optimized value, the mobile terminal generates a control signal mapped to the corresponding group to adjust the matching value of the RF transmitter, resulting in maintenance of optimized performance. That is, the mobile terminal performs matching optimization by generating the control signal in adaptation to the network environment.

Although the groups are discriminated by the bandwidth and modulation parameters for adjusting the impedance in the exemplary mapping table of Table 3, the present invention is not limited thereto. Rather, the groups can be discriminated more narrowly or broadly according to the system environment. For example, the groups can be discriminated by the bandwidth and modulation parameters roughly and further discriminated by the RB, RB offset, and frequency parameters finely.

TABLE 5

| Group | Parameter | | | | | |
|---|---|---|---|---|---|---|
| | Bandwidth | Modulation | RB | RB offset | Center Frequency | Impedance control |
| Group 1 | A | X | 1 | 1 | 2505 | $C_1$ |
| | | | . | . | . | |
| | | | . | . | . | |
| | | | . | . | . | |
| | | | 25 | 24 | 2534 | |
| Group 2 | A | X | 25 | 25 | 2535 | $C_2$ |
| | | | . | . | . | |
| | | | . | . | . | |
| | | | . | . | . | |
| | | | 50 | 49 | 2564 | |
| Group 3 | A | Y | 1 | 1 | 2505 | $C_3$ |
| | | | . | . | . | |
| | | | . | . | . | |
| | | | . | . | . | |
| | | | 25 | 24 | 2534 | |
| Group 4 | A | Y | 26 | 25 | 2535 | $C_4$ |
| | | | . | . | . | |
| | | | . | . | . | |
| | | | . | . | . | |
| | | | 50 | 49 | 2564 | |
| Group 5 | B | X | 1 | 1 | 2510 | $C_5$ |
| | | | . | . | . | |
| | | | . | . | . | |
| | | | . | . | . | |
| | | | 50 | 49 | 2534 | |
| | | | . | | | |
| | | | . | | | |
| | | | . | | | |
| Group N | | | ... | | | $C_N$ |

Table 5 shows an exemplary mapping table in which the parameters are classified into N groups (N is a natural value equal to or greater than 1) according to the bandwidths 1.25 MHz~20 MHz of the LTE system. In Table 5, the N groups are discriminated based on the bandwidth, modulation, RB, RB offset, and frequency parameters such that the size of each group is formed narrowly as compared to Table 3. In this case, the total number of groups discriminated according to the network environment is 8 (N=8).

Figure 2:
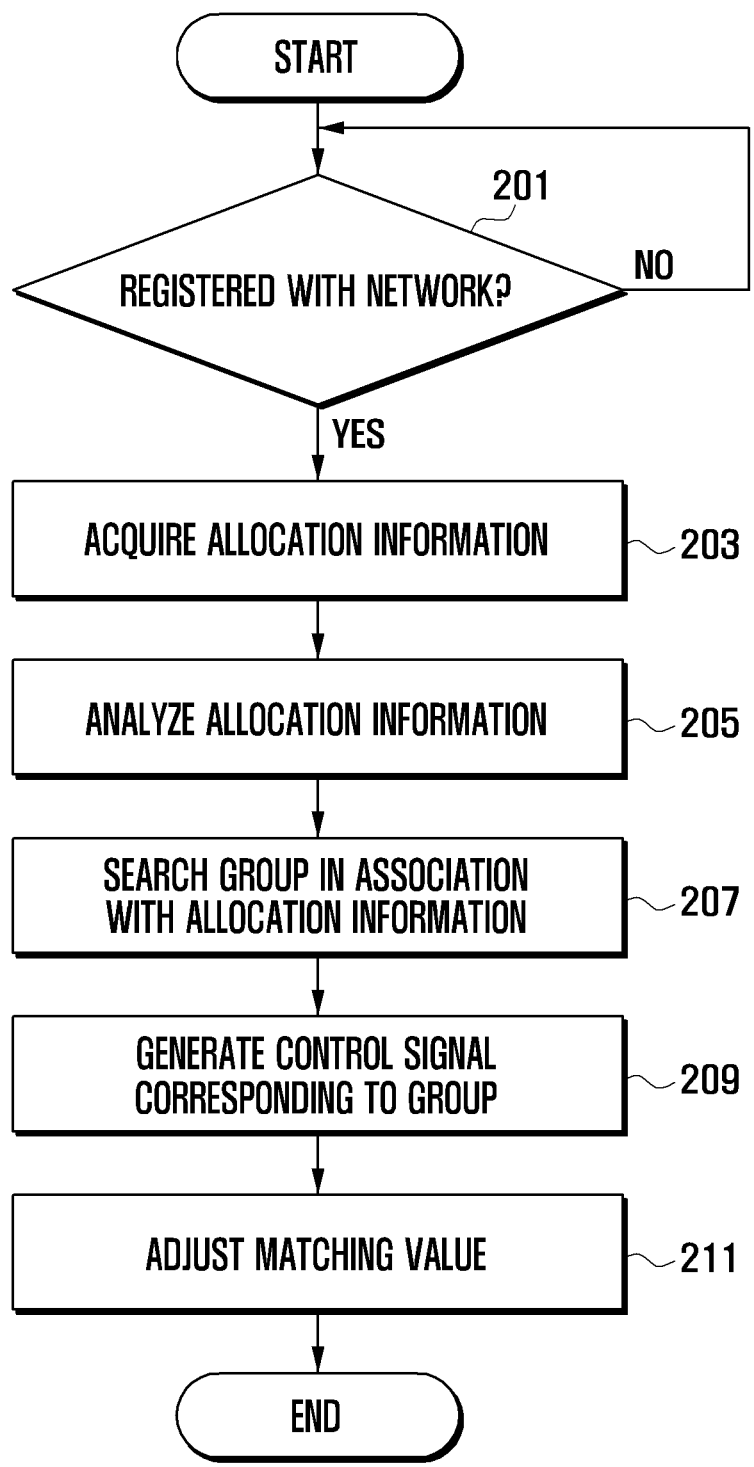
FIG. 2 is a flowchart illustrating a method for optimizing transmission performance by adjusting a matching value of an RF transmitter of a mobile terminal according to an exemplary embodiment of the present invention.

FIG. 2 is a flowchart illustrating a method for optimizing transmission performance by adjusting a matching value of an RF transmitter of a mobile terminal according to an exemplary embodiment of the present invention.

Referring to FIG. 2, the control unit 300 determines whether the mobile terminal is registered with (attached to) the network in step 201. For example, the control unit 300 controls data exchanged by the mobile terminal with the network and determines whether the mobile terminal is registered with the network.

In step 203, the control unit 300 acquires the allocation information from the network resulting from the process of registering with the network. For example, the control unit 300 can acquire the allocation information from the network through data communication with the network. Here, the received allocation information can be saved in the storage unit (not shown) temporarily.

The control unit 300 analyzes the acquired allocation information in step 205. For example, the control unit 300 can determine the <bandwidth> parameter, <modulation> parameter, <RB> parameter, <RB offset> parameter, and <frequency> parameter by parsing the allocation information as described.

The control unit 300 performs a group search based on the allocation information in step 207. For example, the control unit 300 looks up the mapping table stored in the form of Table 3 or Table 5 to retrieve a group having the parameters in the allocation information.

The control unit 300 generates a control signal corresponding to the retrieved group in step 209 and controls to adjust the matching value according to the control signal in step 211. For example, once a group corresponding to the allocation information is retrieved, the control unit 200 issues the control signal mapped to the group to the variable impedance IC 150 such that the impedance of the variable impedance IC 150 is adjusted.

Figure 3:
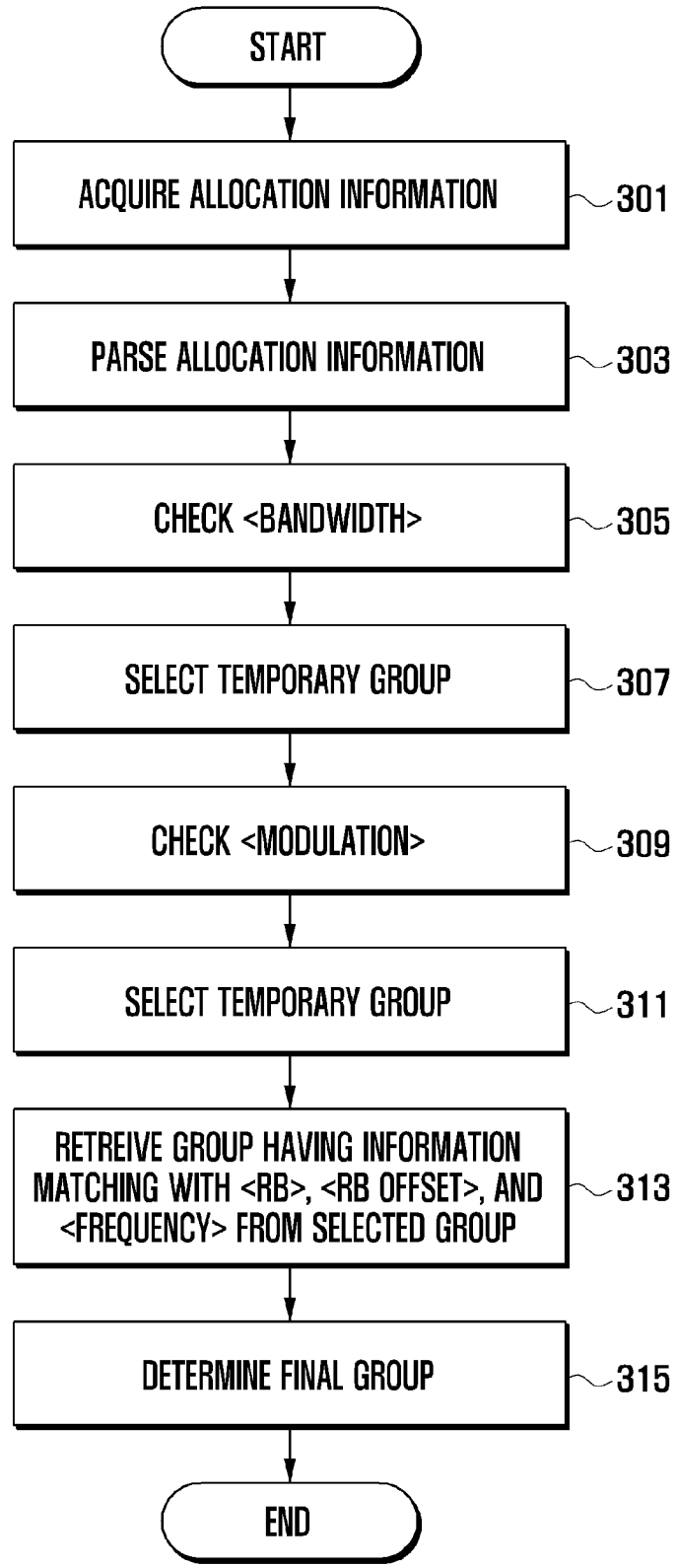
FIG. 3 is a flowchart illustrating a procedure for determining a matching group for optimizing transmission performance of a mobile terminal according to an exemplary embodiment of the present invention.

FIG. 3 is a flowchart illustrating a procedure for determining a matching group for optimizing a transmission performance of a mobile terminal according to an exemplary embodiment of the present invention.

Referring to FIG. 3, the control unit 300 acquires the allocation information from the network in step 301 and performs parsing to analyze the acquired allocation information in step 303. For example, the control unit 300 parses the allocation information into a <bandwidth> parameter, a <modulation> parameter, an <RB> parameter, an <RB offset> parameter, and a <frequency> parameter.

The control unit 300 determines the information contained in the <bandwidth> parameter (or bandwidth information) in step 305, and selects at least one temporary group (or first temporary group) having the information matched to the bandwidth information from a predefined mapping table in step 307.

The control unit 300 determines the information contained in the <modulation> parameter (or modulation information) of the allocation information in step 309 and selects at least one temporary group (or second temporary group) having the information matched to the modulation information from the at least one first temporary group in step 311. The number of the at least one second temporary group can be equal to or less than the number of the at least one first temporary group.

The control unit 300 can search for a group having the information indicated in the <RB> parameter, the <RB offset> parameter, and the <frequency> parameter (or resource/frequency information) within the at least one second temporary group in step 313. In step 315, the control unit 300 can select the retrieved group as the one finally discovered for use in adjustment of the matching value for maintaining the transmission performance in adaptation to the network environment in accordance to the finally selected group. That is, the control unit 300 generates the control signal corresponding to the finally selected group to the variable impedance IC 150 such that the variable impedance IC 150 adjusts the impedance.

As described above, the method and apparatus for optimizing the transmission performance of a mobile terminal according to exemplary embodiments of the present invention are capable of adjusting the matching value of the RF transmitter of the mobile terminal based on the allocation information provided by the network. Exemplary embodiments of the present invention are advantageous to maintain the transmission performance of the mobile terminal at a level optimized for the network environment. More particularly, the method and apparatus according to exemplary embodiments of the present invention are capable of optimizing the transmission performance of the mobile terminal by adjusting the matching value of the RF transmitter of the mobile terminal according to the allocation information such as bandwidth, modulation scheme, RB, RB offset, and frequency determined by the network of an LTE system. Of course, exemplary embodiments of the present invention can be applied to all the types of communication devices supporting LTE communication.

The method and apparatus according to exemplary embodiments of the present invention negates the closed loop-based calibration requiring feedback of the power detector, resulting in reduction of calibration delay. The method and apparatus according to exemplary embodiments of the present invention are capable of reducing the transmission performance deviation of the mobile terminal even with a large number of cases of network environment.

As described above, the method for optimizing transmission performance in adaptation to the network environment according to exemplary embodiments of the present invention can be recorded in computer-readable storage media in the form of program commands so as to be executed by various computer means. Here, the computer-readable storage media can store the program commands, data files, and data structures independently or in the form of their combination. The program commands recorded in the storage media can be the ones designed and configured for dedicated use in the exemplary embodiments of present invention or the ones well-known to those in the computer software field.

The computer-readable media may include program commands, data files, data structures, etc., separately or compositely. The program commands recorded in the media may be particularly designed and configured for the exemplary embodiments of present invention, or known and used by those skilled in the computer software field. The computer-readable media may be magnetic media such as a hard disk, a floppy disk and magnetic tape, optical media such as a Compact Disk-Read-Only Memory (CD-ROM) and a Digital Versatile Disk (DVD), magneto-optical media such as floptical disk, and hardware devices such as a ROM, a Random-Access Memory (RAM), a flash memory, etc., particularly implemented to store and execute program commands. The program commands may be machine language codes produced by a compiler and high-level language codes that can be executed by computers using an interpreter, etc. In order to perform the operations according to exemplary embodiments of the present invention, the hardware devices may be implemented to operate as at least one software module, and vice versa.

Although exemplary embodiments of the present invention have been described hereinabove, it should be clearly understood that many variations and/or modifications of the basic inventive concepts herein taught which may appear to those skilled in the present art will still fall within the spirit and scope of the present invention, as defined in the appended claims.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for optimizing transmission performance of a mobile terminal, the method comprising:
   acquiring allocation information from a network;
   searching for a group of information matching the allocation information from a predetermined mapping table;
   generating a control signal for adjusting a match value according to the group; and
   adjusting the matching value of a transmitter of the mobile terminal by changing impedance according to the control signal.

2. The method of claim 1, wherein the allocation information comprises at least one of a bandwidth, a modulation scheme, a resource block, a resource block offset, and a frequency allocated to the mobile terminal.

3. The method of claim 2, wherein the searching comprises:
   parsing the allocation information into conditions;
   determining the parsed conditions; and
   retrieving the group having the information fulfilling the conditions from the mapping table.

4. The method of claim 3, wherein the retrieving comprises:
   determining a first condition on the bandwidth;
   selecting at least one first temporary group having a condition matching with the first condition from the mapping table;
   determining a second condition on the modulation scheme; and
   selecting at least one second temporary group having a condition matching with the second condition from the at least one first temporary group.

5. The method of claim 4, wherein the retrieving comprises:
   determining third conditions on the resource block, the resource block offset, and the frequency;
   selecting at least one third temporary group having conditions matching with the third conditions from the at least one second temporary group; and
   determining the at least one third temporary group as a final group for use in adjustment of the matching value of the transmitter.

6. The method of claim 5, further comprising adjusting the matching value for maintaining the transmission performance according to the final group.

7. The method of claim 6, wherein the adjusting comprises:
   transferring the control signal mapped to the final group to a variable impedance circuit; and
   adjusting impedance of the variable impedance circuit according to the control signal.

8. The method of claim 2, wherein the searching comprises retrieving at least one group having conditions matching with conditions of the bandwidth and the modulation scheme from the mapping table.

9. The method of claim 2, wherein the generating comprises transferring the control signal associated with the group to a variable impedance circuit for adjusting the impedance.

10. A mobile terminal comprising:
    a control unit for controlling transmitting of a radio frequency signal, for acquiring allocation information from a network, for searching for a group of information matching the allocation information from a predetermined mapping table, and for generating a control signal for adjusting a match value according to the group; and a Radio Frequency (RF) transmitter for adjusting the matching value according to the control signal generated by the control unit and for transmitting the radio frequency signal at a transmit power level determined based on the adjusted matching value.

11. The mobile terminal of claim 10, wherein the RF transmitter comprises:
a power amplifier module for amplifying the radio frequency signal to a level to be transmitted via an antenna;
a matching circuit for performing impedance matching;
a variable impedance circuit for changing the matching value of the matching circuit; and
a duplexer for transmitting the radio frequency signal at the transmit power level determined by the matching value adjusted by the variable impedance circuit.

12. The mobile terminal of claim 11, wherein the control unit generates the control signal for adjusting an impedance of the variable impedance circuit based on the allocation information.

13. The mobile terminal of claim 12, wherein the variable impedance circuit is driven by the control signal generated by the control unit and adjusts the impedance to a level indicated by the control signal.

14. The mobile terminal of claim 12, wherein the control unit comprises at least one control pin for delivering the control signal to the variable impedance circuit, and further wherein the control unit determines the impedance for optimizing the transmission performance of the RF transmitter according to the allocation information by referencing the predetermined mapping table and transfers the control signal for adjustment of the impedance to the variable impedance circuit via the control pin.

15. The mobile terminal of claim 14, wherein the allocation information comprises at least one of a bandwidth, a modulation scheme, a resource block, a resource block offset, and a frequency allocated by the network.

16. The mobile terminal of claim 10, wherein the control unit analyzes the allocation information received from the network, and generates the control signal for maintaining the transmit power of the radio frequency signal at a predetermined level by performing impedance matching based on the allocation information.

* * * * *